United States Patent
Kawano et al.

(10) Patent No.: US 8,810,175 B2
(45) Date of Patent: Aug. 19, 2014

(54) MOTOR CONTROL DEVICE

(75) Inventors: Yu Kawano, Chiyoda-ku (JP);
Masatoshi Saito, Chiyoda-ku (JP);
Takayuki Kifuku, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 387 days.

(21) Appl. No.: 13/253,292

(22) Filed: Oct. 5, 2011

(65) Prior Publication Data
US 2012/0273290 A1 Nov. 1, 2012

(30) Foreign Application Priority Data

Apr. 26, 2011 (JP) ................................. 2011-097993

(51) Int. Cl.
*H02H 7/08* (2006.01)

(52) U.S. Cl.
USPC ................. 318/400.21; 318/434; 318/565

(58) Field of Classification Search
CPC ..... H02P 29/02; H02P 29/021; H02P 21/146;
H02P 6/16; H02P 223/01; H02P 2207/05;
H02P 29/027; H02P 8/36
USPC .............. 318/700, 400.01, 400.15, 400.21,
318/400.32, 400.34, 565, 434
See application file for complete search history.

(56) References Cited

U.S. PATENT DOCUMENTS

| | | | | |
|---|---|---|---|---|
| 5,469,032 A | * | 11/1995 | Otake .................... | 318/400.21 |
| 5,574,346 A | * | 11/1996 | Chavan et al. ............ | 318/434 |
| 5,963,706 A | * | 10/1999 | Baik ...................... | 388/804 |
| 6,392,418 B1 | * | 5/2002 | Mir et al. ................ | 324/503 |
| 6,683,774 B2 | * | 1/2004 | Kameya et al. .......... | 361/139 |
| 7,154,404 B2 | * | 12/2006 | Sato ..................... | 318/400.21 |
| 7,161,317 B2 | * | 1/2007 | Matsushita et al. ....... | 318/432 |
| 2002/0143450 A1 | | 10/2002 | Fujimoto et al. | |
| 2003/0222612 A1 | | 12/2003 | Matsushita | |
| 2008/0004773 A1 | * | 1/2008 | Maeda ................... | 701/41 |
| 2011/0025244 A1 | * | 2/2011 | Ura ...................... | 318/400.21 |

FOREIGN PATENT DOCUMENTS

| | | |
|---|---|---|
| EP | 1737116 A1 | 12/2006 |
| EP | 2164169 A1 | 3/2010 |
| JP | 62-007383 A | 1/1987 |
| JP | 04-067759 A | 3/1992 |

(Continued)

OTHER PUBLICATIONS

Extended European Search Report issued in EP Application No. 11184618.4-1264 dated Jun. 1, 2012.

(Continued)

*Primary Examiner* — Bentsu Ro
(74) *Attorney, Agent, or Firm* — Sughrue Mion, PLLC

(57) ABSTRACT

Provided is a motor control device including a main calculation unit (101), which takes a first operation state for controlling a brushless motor (5), and a second operation state for stopping the motor control, and a sub calculation unit (102) for monitoring the main calculation unit (101) by means of a first monitoring unit (106) in the first state, for calculating a motor rotation angle in the second state, thereby enabling continuous calculation of the motor rotation angle even when the motor control is stopped, for carrying out monitoring the sub calculation unit (102) by means of second monitoring unit (201), thereby securing reliability, and for calculating the motor rotation angle in a second calculation cycle in the second operation state, the second calculation cycle being longer than a first calculation cycle in the first operation state, thereby reducing a current consumption.

14 Claims, 9 Drawing Sheets

(56) References Cited

FOREIGN PATENT DOCUMENTS

| | | |
|---|---|---|
| JP | 04-242111 A | 8/1992 |
| JP | 2000-128003 A | 5/2000 |
| JP | 2002-345285 A | 11/2002 |
| JP | 2003-112644 A | 4/2003 |
| JP | 2005-37254 A | 2/2005 |
| JP | 2005-140739 A | 6/2005 |
| JP | 2006-322794 A | 11/2006 |
| JP | 2009-077503 A | 4/2009 |
| JP | 2010-155592 A | 7/2010 |

OTHER PUBLICATIONS

Preliminary Notice of Reasons for Rejection, dated Apr. 9, 2013, Patent Application No. 2011-097993.

* cited by examiner

MOTOR CONTROL DEVICE

BACKGROUND OF THE INVENTION

1. Field of the Invention

The present invention relates to a motor control device, and more particularly, to a motor control device installed on an electric power steering device and the like.

2. Description of the Related Art

In recent years, types of control which require information on a steering angle of a vehicle such as an attitude control system for a vehicle using an electronic stability control device (such as ESC), a parking assist system for automatically steering a steering wheel, and the like are increasing in the field of the motor vehicle control. As a result, a steering angle sensor is installed on a vehicle in order to detect the steering angle. The steering sensor is directly attached on a steering shaft.

The steering shaft may be rotated regardless of an on/off state of an ignition switch (hereinafter, referred to as IG switch). Therefore, it is necessary to always detect an angle with respect to a reference point for detecting an absolute position of the steering angle.

As a method of detecting an absolute angle of a plurality of rotations of the steering angle, a method described in Japanese Patent Application Laid-open No. 2006-322794, for example, is proposed. In this method, two MR sensors are used, and an absolute angle is detected based on an output relationship between the two sensors. However, the employment of the two sensors increases the cost. Moreover, a range of detecting a plurality of rotations is mechanically limited. Further, it is necessary to pay attention to precise alignment of reference points of the steering angle sensors when the steering angle sensors are installed.

As a method for solving the problems of Japanese Patent Application Laid-open No. 2006-322794, a method described in Japanese Patent Application Laid-open No. Hei 04-242111 (JP No. 1992-242111 A), for example, is proposed. This method employs a rotary encoder for detecting only a relative position of the steering angle, thereby detecting an absolute position of the steering angle. This method employs the rotary encoder, and detects the absolute position of the steering angle immediately after the IG switch is turned on. Note that, a microcomputer 1 and a microcomputer 2 are provided. The microcomputer 1 detects the steering angle during the time when the IG switch is on. Moreover, a backup power supply and a non-volatile memory are provided in case the IG switch is turned off. The microcomputer 1 stores a neutral point of the steering angle in the non-volatile memory immediately before the IG switch is turned off. The microcomputer 2 continuously detects the relative position of the steering angle during the time when the IG switch is off until the IG switch is turned on again. When the IG switch is turned on, the absolute position of the steering angle is immediately detected from the neutral point stored in the non-volatile memory and the relative position during the time when the IG switch is off.

The electric power steering is provided with a motor for generating a steering assist force on the steering shaft. Particularly if a motor control device employing a brushless motor is used, the motor rotation angle is detected to thereby provide assist control. Motor rotation angle detection means used for the brushless motor control can be used as means for detecting the steering angle information. The steering angle information of a vehicle can be inexpensively acquired in this case compared with the case in which a steering angle sensor is added on the steering shaft. Moreover, the motor rotation angle detection means is integrated into the motor control device, resulting in space saving.

The motor rotation angle detection means of the motor control device can detect the relative position of the motor rotation angle only in a period in which the IG switch is on and the motor control is provided, similarly to in the case of the rotary encoder. However, considering a case in which the motor is rotated by an external force during the time when the IG switch is off, it is necessary to continuously detect the motor rotation angle in the period in which IG switch is off and the motor control is not provided in order to detect the absolute position of the steering angle without an error.

Moreover, it is extremely important to reduce a current consumption in order to prevent a battery from being drained in the period in which the IG switch is off. However, the method according to Japanese Patent Application Laid-open No. Hei 04-242111 has a problem that the reduction in the current consumption is not intended.

Moreover, the steering angle information used for the electric power steering device is intended for assisting the steering of a steering wheel by the user, and it is thus necessary to sufficiently consider the safety. Reliability of calculation means for calculating the motor rotation angle is thus important. However, the method according to Japanese Patent Application Laid-open No. Hei 04-242111 has a problem that a configuration for securing the reliability of the calculation means is not described.

SUMMARY OF THE INVENTION

The present invention has been made in view of the above-mentioned problems, and has an object to provide a motor control device capable of continuing calculation of a motor rotation angle at a low current consumption while the reliability of the motor rotation angle is secured even in a period in which motor control is stopped.

According to the present invention, there is provided a motor control device including: motor rotation angle detection means for outputting a motor rotation angle signal for detecting a rotation angle of a motor; calculation means for carrying out control for the motor; and monitoring means for detecting presence/absence of an abnormality of the calculation means, in which: the calculation means has two operation states; one of the two operation states is a first operation state in which the rotation angle of the motor is calculated based on the motor rotation angle signal output from the motor rotation angle detection means, and the control is provided for the motor based on the calculated rotation angle of the motor; and another one of the two operation states is a second operation state in which the control for the motor is stopped, and only the calculation of the rotation angle of the motor is carried out based on the motor rotation angle signal output from the motor rotation angle detection means.

According to the present invention, the motor control device includes: motor rotation angle detection means for outputting a motor rotation angle signal for detecting a rotation angle of a motor; calculation means for carrying out control for the motor; and monitoring means for detecting presence/absence of an abnormality of the calculation means, in which: the calculation means has two operation states; one of the two operation states is a first operation state in which the rotation angle of the motor is calculated based on the motor rotation angle signal output from the motor rotation angle detection means, and the control is provided for the motor based on the calculated rotation angle of the motor; and another one of the two operation states is a second operation state in which the control for the motor is stopped, and only the calculation of the rotation angle of the motor is carried out based on the motor rotation angle signal output from the motor rotation angle detection means. Therefore, the calculation of the motor rotation angle may be continued at a low current consumption while the reliability of the motor rotation angle is secured even in a period in which motor control is stopped.

DETAILED DESCRIPTION OF THE PREFERRED EMBODIMENTS

First Embodiment

A description is now given of an embodiment in which a motor control device according to the present invention is applied to an electric power steering system. The same or corresponding components are denoted by the same numerals in the respective drawings.

Figure 1:
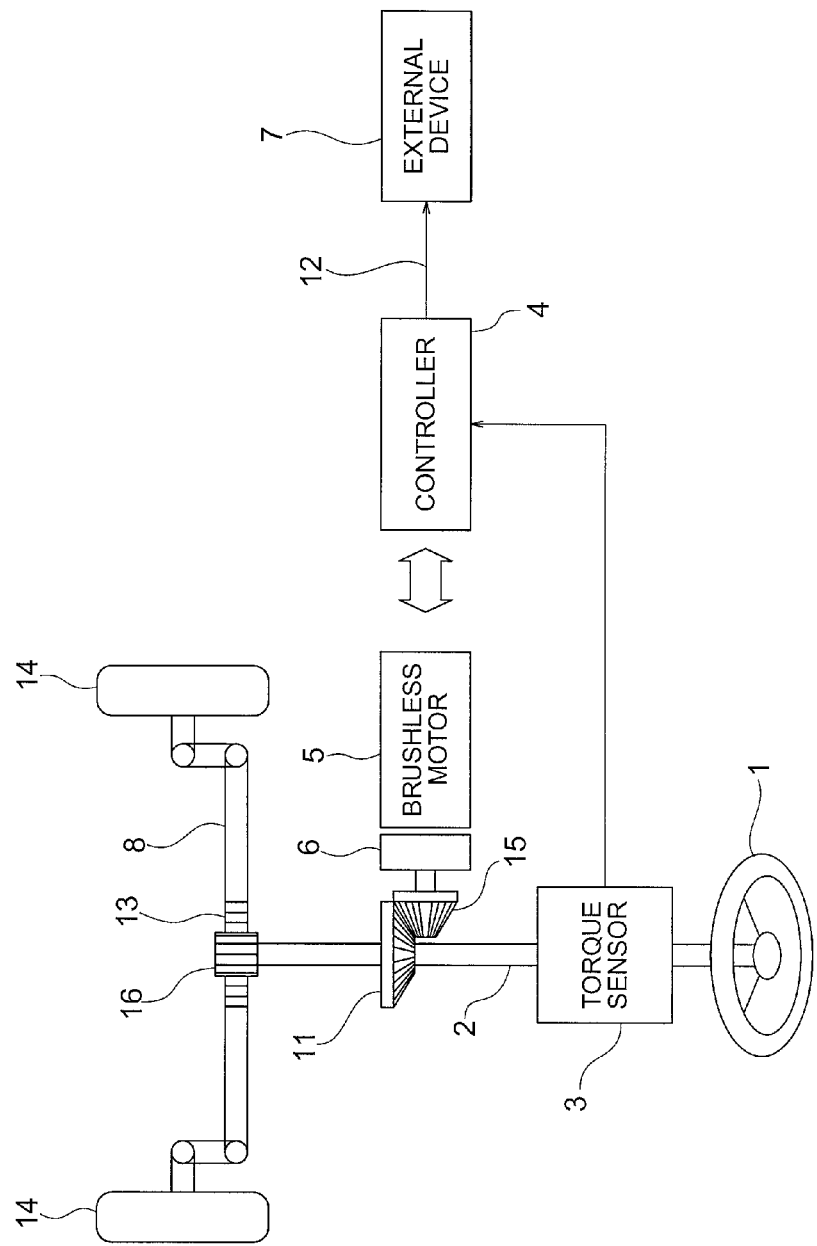
FIG. 1 is a block diagram illustrating an overall configuration of an electric power steering device according to a first embodiment of the present invention.

FIG. 1 is a configuration diagram schematically illustrating an electric power steering device using a motor control device according to the first embodiment of the present invention. The electric power steering device is provided on a vehicle such as a motor vehicle, and assists a steering force by means of a brushless motor. A steering wheel 1 is attached to one end of a steering shaft 2 as illustrated in FIG. 1. A gear 16 (pinion gear) is provided on the other end of the steering shaft 2. An axle 8 is coupled vertically to the steering shaft 2 via the gear 16. A rack 13 is formed at an engaging portion between the axle 8 and the gear 16. The rack 13 is a gear in a straight shape (rod shape or plate shape). If the steering shaft 2 rotates while the rack 13 and the gear 16 are meshed with each other, the axle 8 moves according to the rotation. The direction of the movement is in the axial direction of the axle 8. Both wheels 14 for the vehicle are provided on both ends of the axle 8. A torque sensor 3 is provided on the steering shaft 2 close to the steering wheel 1. Moreover, a reduction gear 11 is provided between the torque sensor 3 and the gear 16 on the steering shaft 2. The reduction gear 11 meshes with a gear 15. A brushless motor 5 is connected to the gear 15. A resolver 6 (motor rotation angle detection means) for outputting a motor rotation angle signal according to a rotation angle of the brushless motor 5 is provided to the brushless motor 5. Moreover, a controller 4 is connected to the brushless motor 5. A motor angle signal from the resolver 6 and a torque detection signal from the torque sensor 3 are input to the controller 4, thereby controlling the brushless motor 5. Moreover, the controller 4 is connected to an external device 7 such as a brake control device via a communication line 12.

If the steering wheel 1 is operated by a driver, a rotation torque applied by the driver generates a torsion on the steering shaft 2 in the electric power steering device having the above-mentioned configuration. The torque sensor 3 detects the rotation torque based on this torsion, and transmits the rotation torque to the controller 4. On the other hand, the resolver 6 outputs the motor rotation angle signal according to the rotation angle of the brushless motor 5. The controller 4 processes the motor rotation angle signal output from the resolver 6, thereby acquiring the rotation angle of the brushless motor 5. According to the rotation angle, the controller 4 feeds a current according to the torque detected by the torque sensor 3 to the brushless motor 5. If the current is fed to the brushless motor 5, the brushless motor 5 generates an assist torque according to the current, thereby transmitting an assist force to the steering shaft 2 via the gear 15 and the reduction gear 11. The steering shaft 2 rotates in this way, and the axle 8 is moved by the gear 16 at the end of the steering shaft 2. Steering angles of both of the wheels 13 of the vehicle then change.

As illustrated in FIG. 1, the steering shaft 2 and the brushless motor 5 are connected via the reduction gear 11. The rotation angle of the steering shaft 2 is thus acquired by dividing the angle of the rotation of the brushless motor 5 by the reduction ratio of the reduction gear 11. For that purpose, the controller 4 acquires the rotation angle and the rotation number of the brushless motor 5 from the motor angle signal output from the resolver 6, and acquires the rotation angle of the steering shaft 2 from these values. Moreover, the rotation angle of the steering shaft 2 is transmitted to the external device 7 such as the brake control device via the communication line 12.

Figure 2:
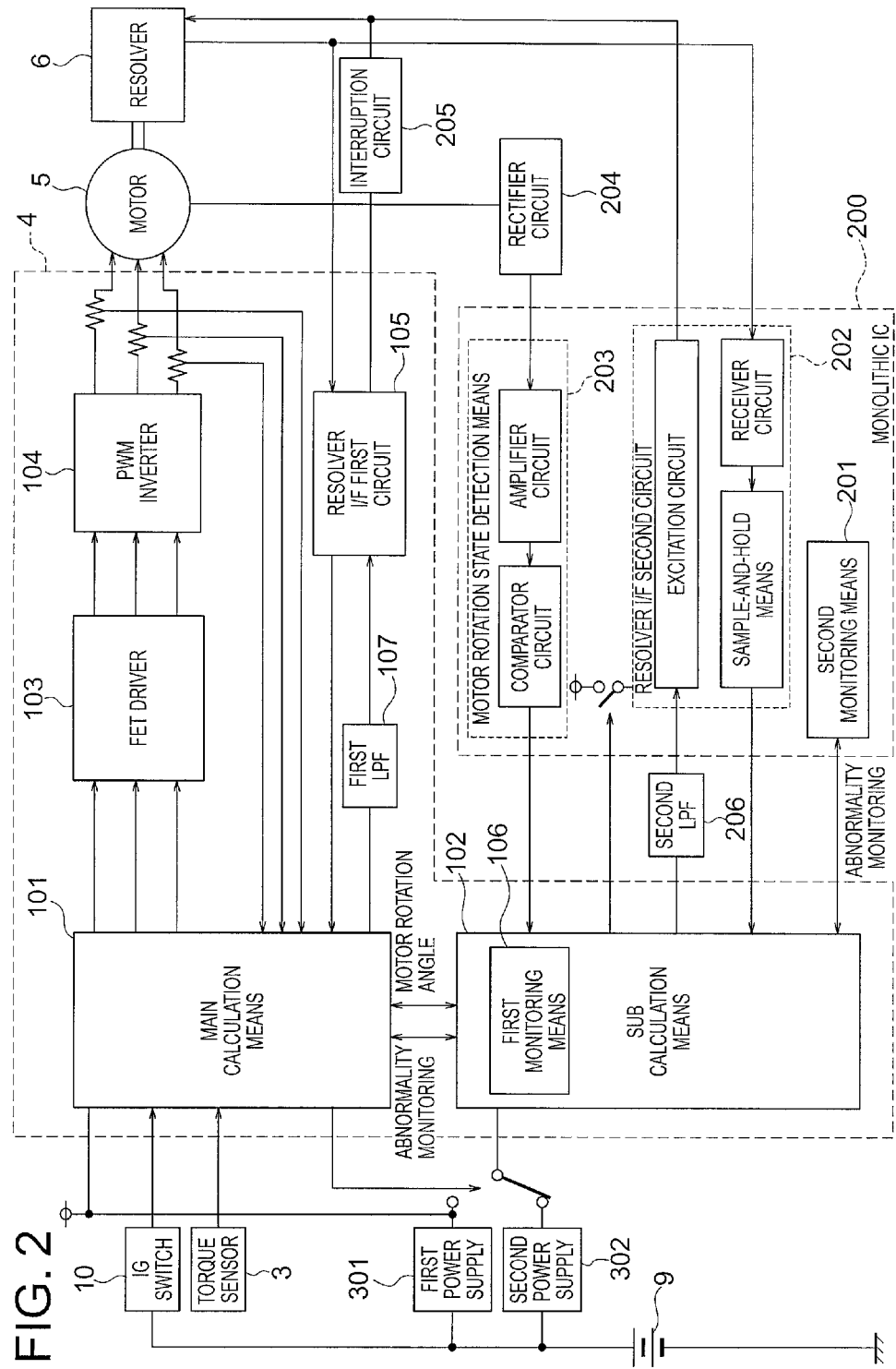
FIG. 2 is a block diagram illustrating a configuration of a motor control device according to the first embodiment of the present invention.

A description is now given of a configuration of the motor control device according to the first embodiment referring to FIG. 2. In FIG. 2, the same components are denoted by the same numerals as in FIG. 1.

Note that, the motor control device according to this embodiment includes the controller 4, a monolithic IC 200, the resolver 6, a rectifier circuit 204, an interruption circuit 205, a second LPF 206, a first power supply 301, and a second power supply 302 in the configuration illustrated in FIG. 2. It is not necessary to provide all the components, and the components may be provided as necessary.

The controller 4 includes main calculation means 101, sub calculation means 102, an FET driver 103, a PWM inverter 104, a resolver I/F first circuit 105, and a first LPF 107. The main calculation means 101 communicates with the resolver 6 via the resolver I/F first circuit 105.

Moreover, the monolithic IC 200 is connected to the controller 4. The monolithic IC 200 includes second monitoring means 201, a resolver I/F second circuit 202, and motor rotation state detection means 203. The second monitoring means 201 monitors presence/absence of an abnormality of the sub calculation means 102. The sub calculation means 102 communicates with the resolver 6 via the resolver I/F second circuit 202. The motor state detection means 203 includes an amplifier circuit for amplifying an induced voltage of the brushless motor 5, and a comparator for comparing the induced voltage output from the amplifier circuit and a predetermined threshold with each other. Moreover, the resolver I/F second circuit 202 includes an excitation circuit for applying an excitation signal to the resolver 6, a receiver circuit for receiving and amplifying the motor rotation angle signal from the resolver 6, and sample-and-hold means for sampling and holding the motor rotation angle signal received by the receiver circuit. The excitation signal is a pulse signal, and the sample-and-hold means samples the motor rotation angle signal immediately after the pulse signal turns on, and holds the motor rotation angle signal immediately before the pulse signal turns off.

Note that, the main calculation means 101 is constructed by one microcomputer, and the sub calculation means 102 is constructed by another microcomputer.

First, a description is given of a first operation state in which an IG switch 10 turns on, and the motor control is carried out by the main calculation means 101.

The controller 4 receives an IG-on signal from the IG switch 10, and carries out the motor control by means of the main calculation means 101. After receiving the IG-on signal, the main calculation means 101 calculates the rotation angle of the brushless motor 5 from the motor rotation angle signal received from the resolver 6 as described above. The main calculation means 101 transmits a PWM control signal to the FET driver 103 in order to generate an assist torque in response to the torque detected by the torque sensor 3 based on the calculated rotation angle. As a result, a signal is output from the FET driver 103, and the PWM inverter 104 starts driving according to the signal. The PWM inverter 104 feeds currents to the brushless motor 5 so as to generate the assist torque. In this way, the main calculation means 101 carries out the control by transmitting the PWM control signal to the FET driver 103 so that a value of the current fed to the brushless motor 5 becomes a desired value for generating the assist torque.

The sub calculation means 102 includes first monitoring means 106. The first monitoring means 106 always monitors the main calculation means 101 so as to determine whether the main calculation means 101 is in an abnormal state in the first operation state. The main calculation means 101 and the sub calculation means 102 carry out a mutual check of the input signals, checks of various calculation results, and the like by carrying out communication with each other. If an abnormality is detected during these checks, the motor control is stopped, and the main calculation means 101 is reset.

A description is now given of a second operation state in which the IG switch 10 is turned off, and the motor control by the main calculation means 101 is stopped.

If the main calculation means 101 moves from the first operation state to the second operation state, the main calculation means 101 communicates with the sub calculation means 102 to pass the motor rotation angle which has been calculated by the main calculation means 101 from the main calculation means 101 to the sub calculation means 102. In the second operation state, the sub calculation means 102 continues the calculation of the motor rotation angle from the motor rotation angle signal output from the resolver 6 based on the received motor rotation angle.

In other words, the sub calculation means 102 monitors the main calculation means 101 in the first operation state, and continues the calculation of the motor rotation angle in the second operation state. Moreover, the first operation state and the second operation state are switched according to the on/off of the signal from the IG switch 10.

Moreover, the presence/absence of an abnormality in the sub calculation means 102 is monitored by the second monitoring means 201 of the monolithic IC 200 in order to increase reliability of the calculation of the rotation angle. The monitoring by the second monitoring means 201 includes a window watch dog timer, a power-on reset, a low voltage detection, and checks of various calculation results. If an abnormality is detected, the sub calculation means 102 is reset.

Moreover, in the first operation state, the sub calculation means 102 can calculate the motor rotation angle independently of the main calculation means 101. This results in dual calculation of the motor rotation angle by the main calculation means 101 and the sub calculation means 102, and redundancy is secured for the calculation of the motor rotation angle, resulting in an increase in reliability of the motor angle detection.

Moreover, the interruption circuit 205 is provided between the resolver I/F first circuit 105 and an excitation coil of the resolver 6. The power supply (first power supply 301) for the resolver I/F first circuit 105 is interrupted in the second operation state, and hence a connection between the resolver I/F first circuit 105 and the excitation coil of the resolver 6 is interrupted by the interruption circuit 205. As a result, the resolver I/F second circuit 202 of the monolithic IC 200 can continue the excitation operation without the influence from the resolver I/F first circuit 105.

The second operation state is a period in which the motor control is stopped by the IG switch 10, and it is thus assumed that the second operation state is a period in which the engine is stopped on the vehicle on which the electric power steering system is installed. A battery is not charged while the engine is stopped. Therefore, if the current consumption is high in the sub calculation means 102, the voltage of the battery decreases while the IG switch is off, and the engine may fail to start when the IG switch is turned on again. Moreover, there is also a fear that a system cannot be started on an electric vehicle or a hybrid vehicle. The reduction in the current consumption is essential for these reasons.

A description is now given of a method of reducing the current consumption.

A description is first given of a method of changing the power supply for the sub calculation means 102.

As illustrated in FIG. 2, the first power supply 301 and the second power supply 302 are provided as two constant voltage regulators whose source power supply is a battery 9. On this occasion, the second power supply 302 can be small in output current compared with the first power supply 301, and a power supply the current consumption of which is as small as possible is thus used.

In the second operation state, the sub calculation means 102 carries out the calculation using the second power supply 302 in order to reduce the current consumption. Therefore, in the second operation state, the current consumption can be reduced by using the second power supply 302 small in current consumption as the power supply for the sub calculation means 102.

Moreover, though the sub calculation means 102 may use any one of the first power supply 301 and the second power supply 302 in the first operation state, both the main calculation means 101 and the sub calculation means 102 use the first power supply 301.

As a result, the sub calculation means 102 which has an object of monitoring the main calculation means 101 uses the same first power supply 301 as the main calculation means 101 in the first operation state, and the same reference voltage can thus be used for A/D converters, thereby reducing an error in the A/D converters between the main calculation means 101 and the sub calculation means 102, which leads to a reduction of a false determination in the monitoring.

Figure 3:
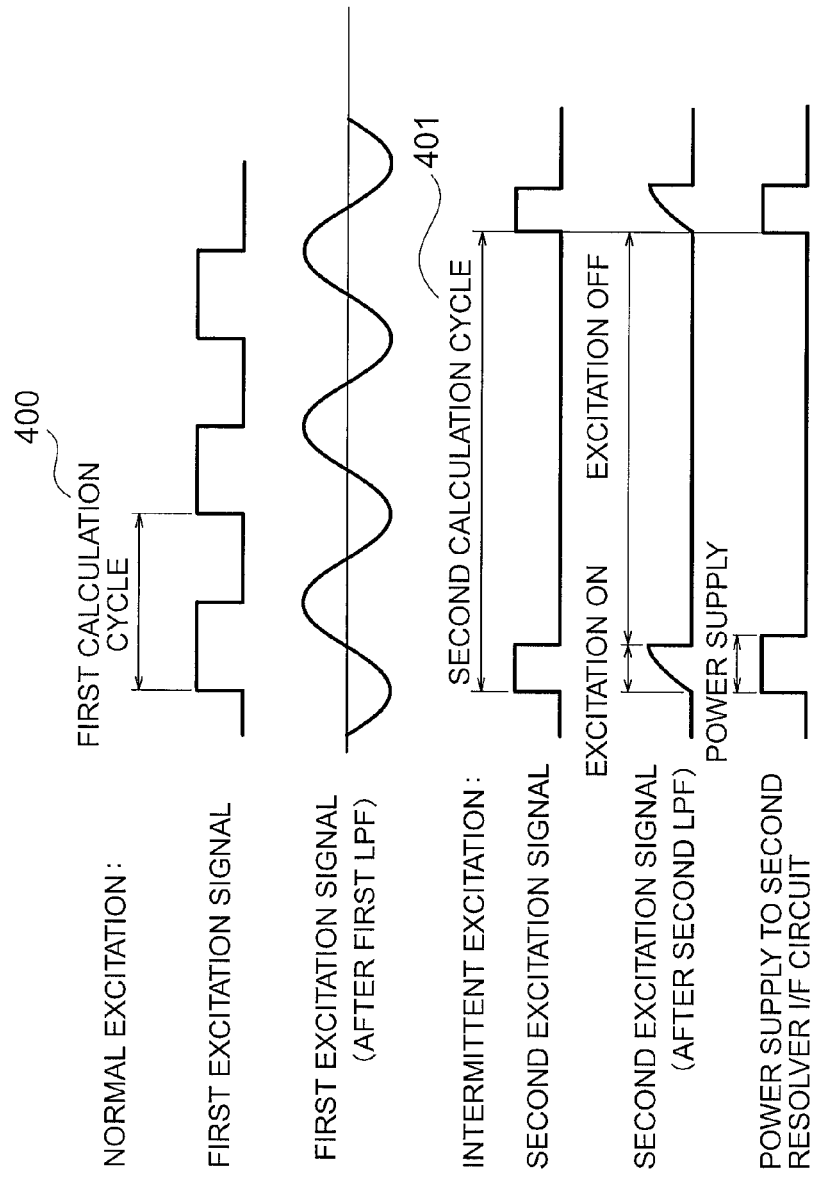
FIG. 3 is a chart illustrating a first calculation cycle, a second calculation cycle, and an excitation signal in synchronism with the second calculation cycle in the motor control device according to the first embodiment of the present invention.

Referring to FIG. 3, a description is now given of a method of changing a calculation cycle of the sub calculation means 102 in order to reduce the current consumption.

In FIG. 3, the excitation signal in the first operation state is referred to as first excitation signal, and the excitation signal in the second operation state is referred to as second excitation signal. Moreover, reference numeral 400 denotes a calculation cycle of the first excitation signal, and is hereinafter referred to as first calculation cycle. Reference numeral 401 denotes a calculation cycle of the second excitation signal, and is hereinafter referred to as second calculation cycle. The first and second excitation signals applied to the resolver 6 are respectively pulse signals applied in the first calculation cycle and the second calculation cycle as illustrated in FIG. 3.

According to this embodiment, the second calculation cycle 401 of the sub calculation means 102 in the second operation state is changed to a cycle longer than the first calculation cycle 400 of the main calculation means 101 in the first operation state. As a result, a reduction in current consumption is realized.

If the sub calculation means 102 has the longer calculation cycle as described above, circuits such as a CPU constructing the sub calculation means 102 may operate slowly. Therefore, the current consumption can be further reduced by reducing an operation clock frequency of these circuits.

Moreover, if an excitation period for the resolver 6 is shortened, the current flowing through the excitation coil of the resolver 6 can be reduced, resulting in a reduction in current consumption. As a result, the excitation signal supplied to the resolver 6 is adapted to the second calculation cycle 401 and the off period is simultaneously extended, as illustrated in FIG. 3. Note that, in the first calculation cycle 400, the excitation signal in the on period has the same length as that in the off period.

On this occasion, as illustrated in FIG. 3, the current consumption can be further reduced by interrupting the power supply to the excitation circuit of the resolver I/F second circuit 202 in the off period of the second excitation signal. Note that, the resolver I/F second circuit 202 is constructed by the excitation circuit, the receiver circuit, and the sample-and-hold means as illustrated in FIG. 2.

Hereinafter, the excitation operation carried out by the resolver I/F first circuit 105 in the first operation state is referred to as normal excitation, and the excitation operation at the intermittent cycle carried out by the resolver I/F second circuit 202 in the second operation state is referred to as intermittent excitation.

Moreover, the resolver 6 driven by the normal excitation and the intermittent excitation is provided with the excitation coil (not shown) and two detection coils (not shown), and the detection coils are mounted so that the phases thereof are mutually different by 90 degrees with respect to the excitation coil.

In the first operation state, as illustrated in FIG. 2, the first excitation signal output from the main calculation means 101 is input to the I/F first circuit 105 via the first LPF 107. The resolver I/F first circuit 105 converts impedances between the input waveform and the resolver 6. As a result, the first excitation signal (after the first LPF) illustrated in FIG. 3 is input to the resolver 6, resulting in the normal excitation operation.

On the other hand, in the second operation state, the sub calculation means 102 carries out the intermittent excitation in order to reduce the current consumption. The second excitation signal output from the sub calculation means 102 is input to the resolver I/F second circuit 202 via the second LPF 206 as illustrated in FIG. 2. The resolver I/F second circuit 202 converts impedances between the input waveform and the resolver 6. As a result, a voltage of the second excitation signal (after the second LPF) illustrated in FIG. 3 is applied to the resolver 6, resulting in the intermittent excitation operation.

Figure 5:
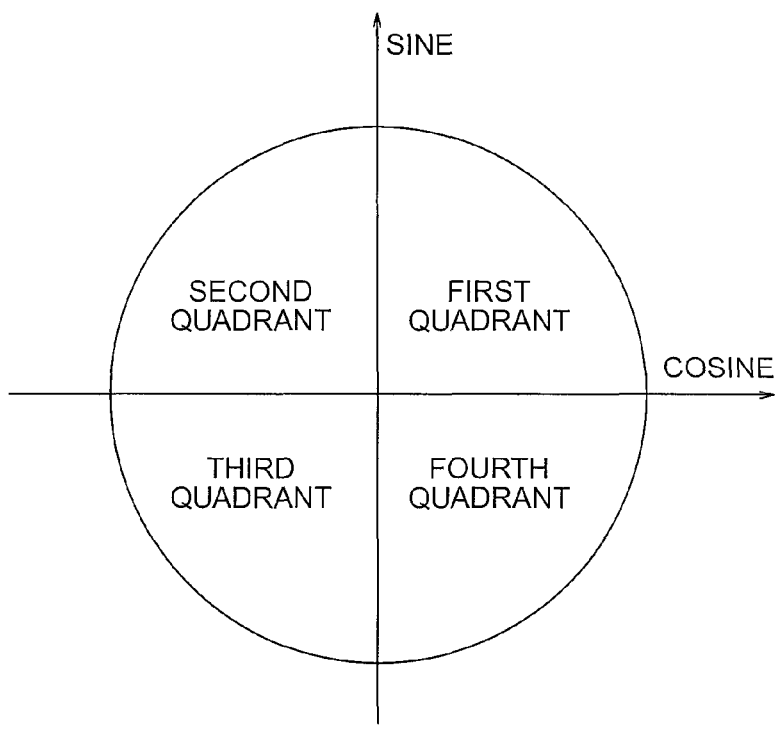
FIG. 5 is a chart illustrating a quadrant determination for intermittent excitation in the motor control device according to the first embodiment of the present invention.

If the resolver 6 is intermittently excited by the second excitation signal (after the second LPF), detection waveforms the amplitude of which is modulated by the rotation angle of the resolver 6 are taken out on the two detection coils of the resolver 6. The two detection coils are different in phase by 90 degrees, and the respective amplitudes of the detected waveforms thus form sine and cosine of the rotation angle of the resolver 6. If the cosine and the sine of the detected voltages of the detection coils are set to X and Y, respectively, and X and Y are represented on an XY plane, a Lissajous circle illustrated in FIG. 5 is obtained. As illustrated in FIG. 5, one rotation of the rotation angle of the resolver 6 can be divided into four areas corresponding to every 90 degrees according to the combination in polarity of the detected voltages. An area in which the sine and cosine are both positive is the first quadrant, an area in which the sine is positive, and the cosine is negative is the second quadrant, an area in which both the sine and cosine are negative is the third quadrant, and an area in which the sine is negative, and the cosine is positive is the fourth quadrant. The quadrants are referred to as first to fourth quadrants on this occasion for the sake of description, but it is not necessary to limit the present invention to this case. The combination in terms of polarity of the detected voltage of the two detection coils in this way can partition the one rotation of the resolver 6 into the four areas corresponding to the every 90 degrees.

A case where the brushless motor 5 moves through the first, second, third, and fourth quadrants in sequence is referred to as a direction 1. Moreover, the opposite direction to the direction 1 is referred to as direction 2. If the brushless motor 5 is rotating in the direction 2, the quadrants changes in a sequence of the fourth, third, second, and first quadrants. Thus, the state of the quadrant is monitored for the each cycle of the intermittent excitation, and a rotation number counter is incremented by +1 for the transition from the fourth quadrant to the first quadrant, and is decremented by −1 for the transition from the first quadrant to the fourth quadrant, thereby measuring the rotation number.

Moreover, the excitation operation by the resolver I/F second circuit 202 is intermittent in the intermittent excitation operation, and hence the timing of the sampling and holding by the sample-and-hold means of the resolver I/F second circuit 202 is set to the change in the second excitation signal from on to off. As a result, the peak value of the detection voltage of the detection coil obtained not after the excitation is turned off but when the excitation is on can be sampled and held.

Figure 4:
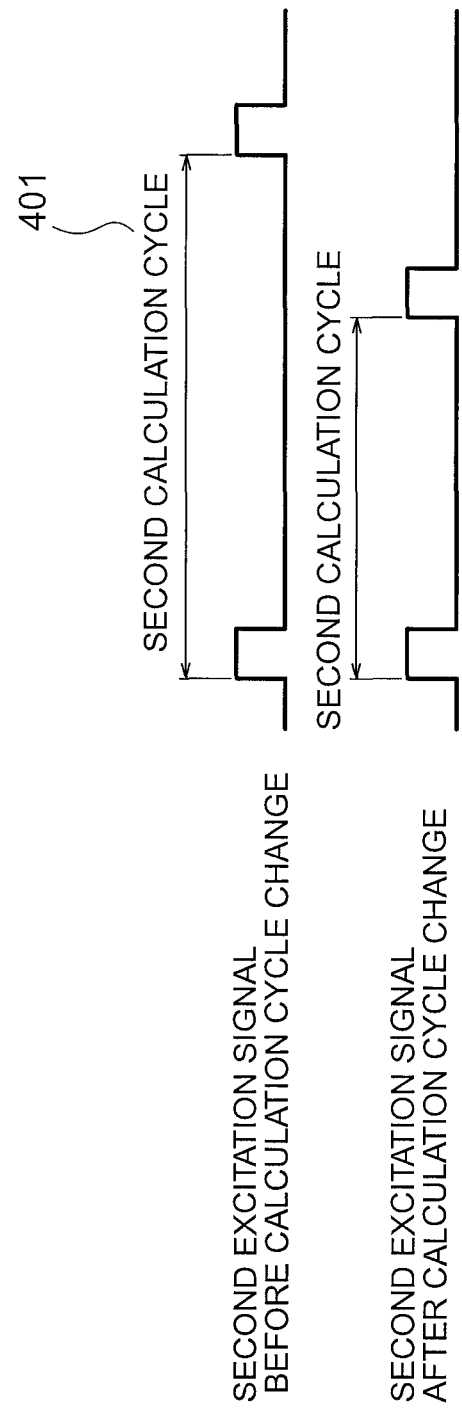
FIG. 4 is a chart illustrating a change in the second calculation cycle in the motor control device according to the first embodiment of the present invention.

The current consumption in the second operation state can be reduced as the second calculation cycle is extended. However, if the brushless motor 5 exceeds a limit of the motor rotation angular velocity which can be measured in the second calculation cycle, reading for determining the quadrant of the rotation angle of the resolver 6 is missed. As a result, the motor rotation angle becomes abnormal. If the miss in the reading of the rotation angle of the brushless motor 5 is generated as described above, an error in the motor rotation angle, namely an error in the angle of the steering shaft 2 occurs. This is a problem which should not occur to the steering angle sensor. Then, according to this embodiment, the second calculation cycle 401 is switched to a short cycle which does not cause a miss in reading of the motor rotation angle as illustrated in FIG. 4 before the brushless motor 5 exceeds the limit of the motor rotation angular velocity which can be measured in the second calculation cycle 401. The motor rotation state detection means 203 is used for determining the limit of the rotation angular velocity of the brushless motor 5.

The motor rotation state detection means 203 determines the rotation state using the induced voltages of the brushless motor 5. The induced voltages of the brushless motor 5 increase as the rotation number increases, and can be used for determining the switching of the second calculation cycle. In other words, the induced voltage of the brushless motor 5 and a predetermined threshold are compared with each other, and if the induced voltages exceed the threshold, the second calculation cycle 401 is switched to the short cycle. The second calculation cycle is shortened as the induced voltage of the brushless motor 5 increases in this way. As a result, the second calculation cycle can be shortened as the rotation number (rotation speed) of the brushless motor 5 increases in this way.

Figure 6:
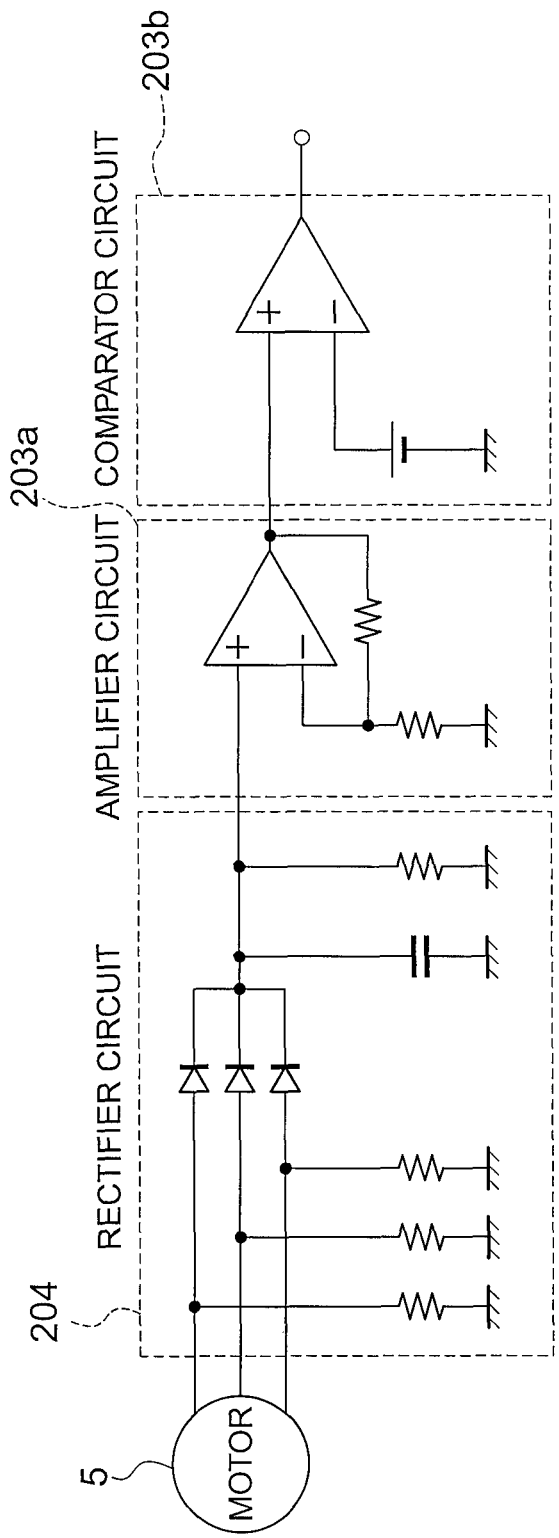
FIG. 6 is a chart illustrating a rectifier circuit and a circuit of motor rotation state detection means in the motor control device according to the first embodiment of the present invention.
Figure 7:
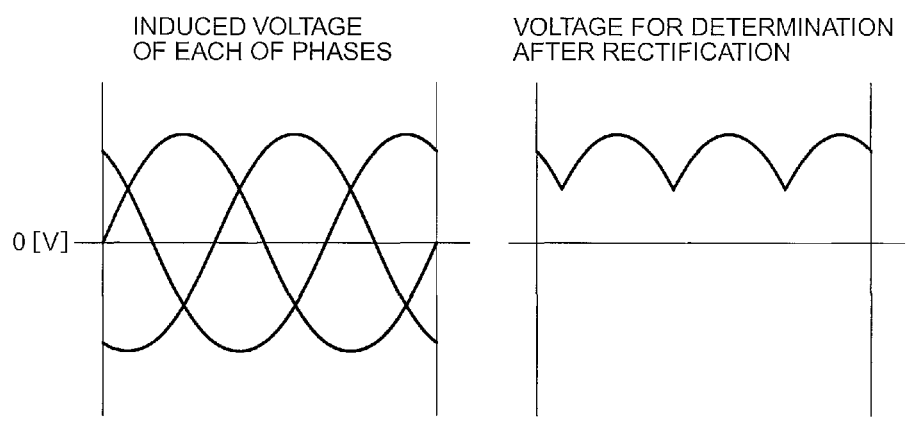
FIG. 7 is a chart illustrating induced voltages of a three-phase AC brushless motor in the motor control device according to the first embodiment of the present invention.

The rectifier circuit 204 of FIG. 2 is used in order to use the induced voltages of the brushless motor 5 for the determination on this occasion. The rectifier circuit 204 uses a rectifier circuit by means of diodes as illustrated in FIG. 6. If the rectification is not carried out, and the induced voltages in three phases are summed, the induced voltages are canceled out to zero, but the induced voltages rectified by the rectifier circuit 204 can be used as the determination voltage. The induced voltages of a three-phase AC motor constructing the brushless motor 5 have peaks of the induced voltages in three phases of U phase, V phase, and W phase for one cycle of the motor electrical angle as illustrated in FIG. 6. The voltage obtained by rectifying the voltages in the three phases enables the determination based on an induced voltage in a phase larger than those in the other phases, and hence it is possible to read a change in the rotation angular velocity of the brushless motor 5 earlier than in the case where only one phase is used for the determination. As a result, the second calculation cycle can be extended, resulting in an increase in the efficiency of reducing the current consumption.

Though a half-wave rectifier circuit is exemplified as the rectifier circuit 204 in FIG. 6, if faster determination is required, a full-wave rectifier circuit may be used.

Moreover, the motor rotation state detection means 203 is connected to the rectifier circuit 204 as illustrated in FIG. 2. The motor rotation state detection means 203 includes an amplifier circuit 203a and a comparator circuit 203b as illustrated in FIG. 6. The gain of the amplifier circuit 203a is set based on resistances of resistors (not shown) connected to the monolithic IC 200. The rotation state of the brushless motor 5 is determined based on a comparison between the induced voltage output from the amplifier circuit 203a and a predetermined determination threshold (predetermined band gap voltage) set in advance to the comparator circuit 203b.

The induced voltage obtained after the rectification by the rectifier circuit 204 is first amplified by the amplifier circuit 203a in order to extend the second calculation cycle of the sub calculation means 102. This enables determination of whether a miss in reading occurs even in a state in which the induced voltages of the brushless motor 5 are low, namely, in a low rotation state of the brushless motor 5. As a result, the second calculation cycle can be extended. Moreover, induced voltage constant may vary depending on the brushless motor 5, and hence the difference may be adjusted by the gain of the amplifier circuit 203a.

Figure 8:
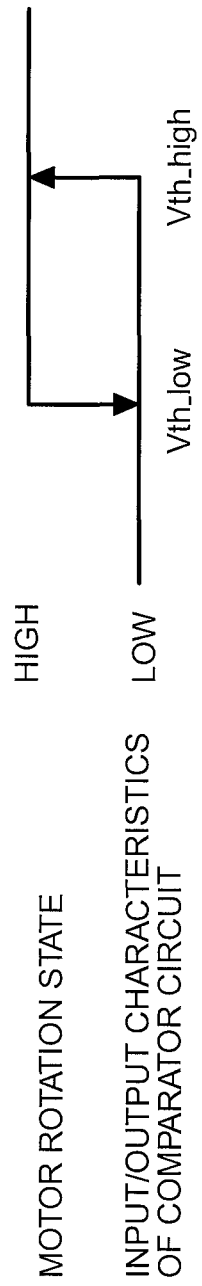
FIG. 8 is a chart illustrating an input hysteresis of a induced voltage determination value of the motor rotation state detection means provided in the motor control device according to the first embodiment of the present invention.

The induced voltage obtained after the amplification by the amplifier circuit 203a is further input to the comparator circuit 203b. The predetermined determination threshold is set in advance to the comparator circuit 203b. If the induced voltage input to the comparator circuit 203b exceeds the determination threshold, the second calculation cycle is switched. Moreover, a hysteresis is set to the input to the comparator circuit 203b. If the half-wave rectifier circuit is used as the rectifier circuit 204, chattering can be prevented by setting the width of the input hysteresis to the comparator circuit 203b illustrated in FIG. 8 according to the following expression so that the hysteresis width is wider than the amplitude of the pulsating current.

$$Vth\_high > Vth\_low \times 2$$

As described above, the motor rotation state detection means 203 is constructed by the amplifier circuit 203a for amplifying the motor induced voltage obtained after the rectification and the comparator circuit 203b having the hysteresis.

Moreover, the second monitoring means 201, the resolver I/F second circuit 202, and the motor rotation state detection means 203 are formed as the monolithic IC 200 in this embodiment illustrated in FIG. 2. As a result, an area used for mounting can be reduced.

If those components are formed as the monolithic IC 200, though the determination threshold of the comparator circuit 203b is restricted by the band gap, and may not be applied to a determination in a system different in motor characteristics, the determination threshold can be applied by adjusting a difference between the motor induced voltage obtained after the rectification and the determination threshold by means of the gain of the amplifier circuit 203a.

A description is now given of effects of the motor control device according to the first embodiment.

As described above, the motor control device according to the first embodiment includes the resolver 6 (motor rotation angle detection means) for detecting the rotation angle of the brushless motor 5, and the controller 4 including the main calculation means 101 and the sub calculation means 102. The main calculation means 101 takes the first operation state in which a calculation is carried out for controlling the brushless motor 5, and the second operation state in which the calculation is not carried out. The sub calculation means 102 monitors the main calculation means 101 in the first operation state, and calculates the motor rotation angle in the second operation state. This configuration enables the continuous detection of the motor rotation angle by means of the sub calculation means 102 even if the main calculation means 101 stops the motor control. The load imposed on the sub calculation means 102 by the calculation of the motor rotation angle is sufficiently small compared with the load imposed on the main calculation means 101 by the calculation for the motor control, and the current consumption on the sub calculation means 102 can thus be reduced compared with the main calculation means 101, resulting in the restriction of the current consumption in the second operation state. As a result, the calculation of the motor rotation angle can be continued while the current consumption is reduced even in the period in which the motor control is stopped.

Moreover, the second monitoring means 201 for monitoring the sub calculation means 102 in the first and second operation states is provided outside the controller 4, and hence the reliability of the sub calculation means 102 thus increases.

Moreover, the first power supply 301 and the second power supply 302 smaller in current consumption than the first power supply 301 are provided, and in the second operation state, the main calculation means 101 is in the stop state, and the sub calculation means 102 is supplied with the electric power from the second power supply 302. As a result, the current consumption can be reduced by switching to the second power supply 302 smaller in current consumption than the first power supply 301 in the second operation state.

Moreover, if both the main calculation means 101 and the sub calculation means 102 are supplied with the electric power from the first power supply 301 in the first operation state, both the main calculation means 101 and the sub calculation means 102 use the same power supply in the first operation state as a result, and the monitoring can be carried out while the voltage levels are unified, resulting in a reduction of the determination error.

Moreover, the main calculation means 101 calculates the motor rotation angle in the first calculation cycle in the first operation state, and the sub calculation means 102 calculates the motor rotation angle based on the motor rotation angle signal output from the resolver 6 in the second calculation cycle longer than the first calculation cycle in the second operation state. The current consumption can be reduced by calculating the motor rotation angle in the second calculation cycle longer than the first calculation cycle of the first operation state.

Moreover, the current consumption can be reduced by using the resolver 6 as the motor rotation angle detection means for detecting the rotation angle of the brushless motor 5 where the excitation signal for the resolver 6 is the pulse signal in synchronism with the second calculation cycle, and setting the on period shorter than the off period of the excitation signal.

Moreover, the sample-and-hold means for sampling and holding the motor rotation angle signal output from the resolver 6 is provided, and the sample-and-hold means samples the motor rotation angle signal immediately after the pulse signal turns on, and holds the motor rotation angle signal immediately before the pulse signal turns off. As a result, the motor angle signal output from the resolver 6 can be acquired independently of the pulse width of the above-mentioned pulse signal and the application timing thereof.

Moreover, the second calculation cycle is shortened as the rotation speed of the brushless motor 5 increases, and hence the calculation cycle can thus be long when the motor rotation speed is low, with the result that the current consumption can be reduced.

Moreover, the second calculation cycle is shortened as the induced voltage of the brushless motor 5 increases. Therefore, the motor rotation speed can be determined based on the induced voltage of the brushless motor 5, which eliminates necessity of a new sensor for detecting the motor rotation speed.

Moreover, the second monitoring means 201, the excitation circuit for applying the excitation signal to the resolver 6, the receiver circuit for inputting the motor angle signal from the resolver 6 into the sub calculation means 102, the sample-and-holed means, and the motor rotation state detection means 203 for determining the motor rotation state based on the induced voltage of the brushless motor 5 constitute the single monolithic IC 200, the area used for mounting is thus small on a board, and the number of components can be reduced.

Moreover, the motor rotation state detection means includes the amplifier circuit 203a for amplifying the induced voltage of the brushless motor 5, and is configured to set the gain of the amplifier circuit 203a by means of the resistances of the resistors (not shown) connected to the monolithic IC 200, and to determine the rotation state of the brushless motor 5 by means of the comparison between the output voltage of the amplifier circuit 203a and the predetermined band gap voltage set inside the monolithic IC 200. If the monolithic IC 200 is used in this way, even if the setting of the determination threshold is restricted by the band gap, or a difference in the motor characteristics occur, a proper determination threshold can be set from the outside of the IC.

Moreover, if the motor control device according to this embodiment is applied to an electric power steering device, the steering angle can be calculated from the calculated motor rotation angle.

Second Embodiment

Figure 9:
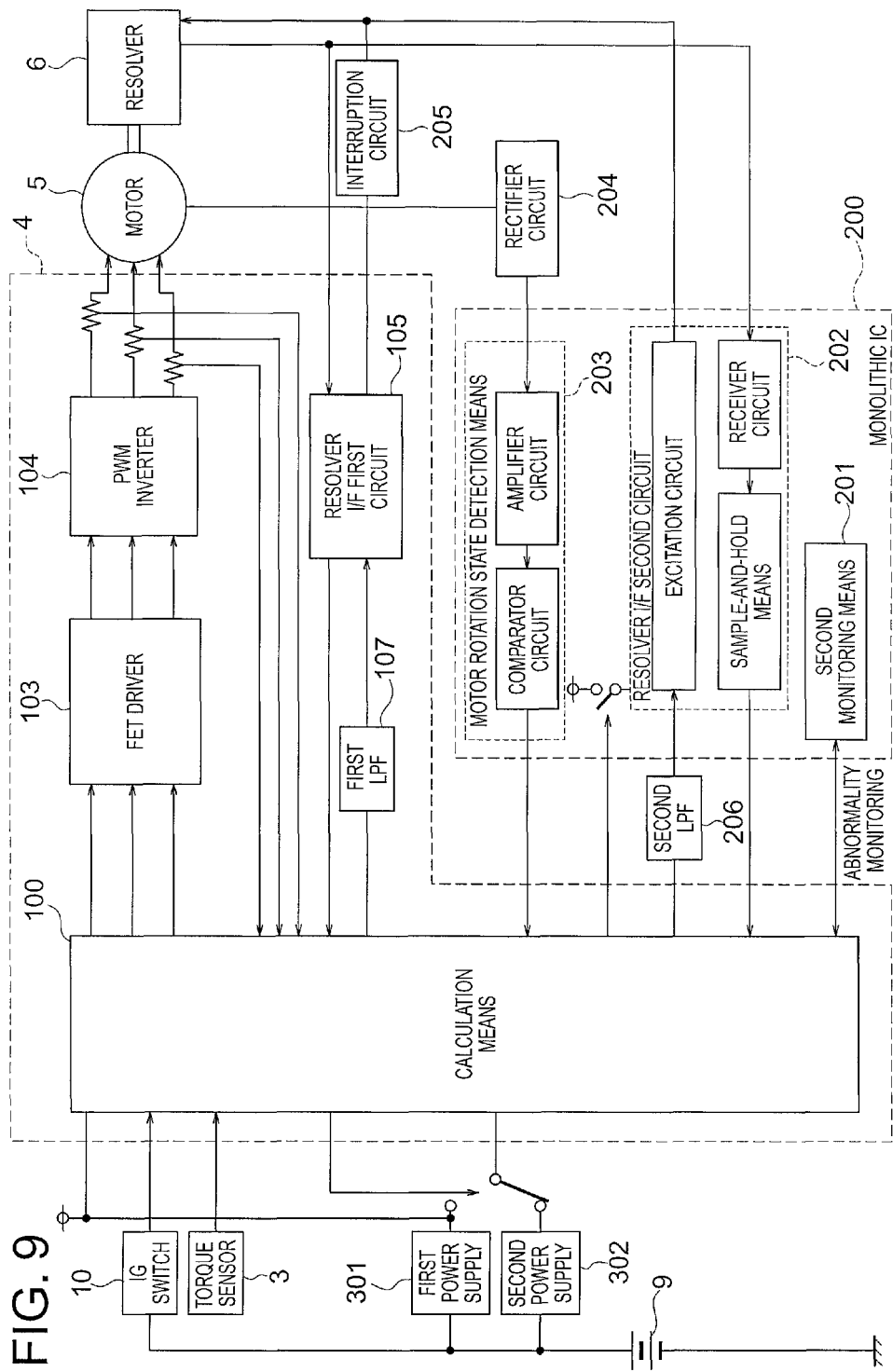
FIG. 9 is a block diagram illustrating a configuration of the motor control device according to a second embodiment of the present invention.

Referring to FIG. 9, a description is now given of a second embodiment in which a motor control device according to the present invention is applied to an electric power steering system. In FIG. 9, components that are the same as or corresponding to those of FIGS. 1 and 2 are denoted by the same numerals.

As illustrated in FIG. 9, the main calculation means 101 and the sub calculation means 102 according to the first embodiment constitute one calculation means 100 according to the second embodiment. This configuration unifies the calculation means, to thereby contribute to a reduction in the cost and the area for mounting. Note that, it is indispensable that the calculation means 100 provides enough capability to control a brushless motor and a low power consumption. Note that, the first monitoring means 106 illustrated in FIG. 2 is not provided according to this embodiment. The other configuration is the same as that illustrated in FIG. 2, and a description thereof is therefore omitted.

Note that, the motor control device according to this embodiment includes a controller 4, a monolithic IC 200, a resolver 6, a rectifier circuit 204, an interruption circuit 205, a second LPF 206, a first power supply 301, and a second power supply 302 in the configuration illustrated in FIG. 9. It is not necessary to provide all the components, and the components may be provided as necessary.

In the control for the motor according to the second embodiment, the calculation means 100 carries out the same motor control as the motor control carried out by the main calculation means 101 illustrated in FIG. 2.

First, a description is given of a first operation state in which the IG switch 10 turns on, and the motor control is carried out by the calculation means 100.

The controller 4 receives an IG-on signal from the IG switch 10, and carries out the motor control by means of the calculation means 100. After receiving the IG-on signal, the calculation means 100 transmits a PWM control signal to an FET drier 103 in order to generate an assist torque in response to a torque detected by a torque sensor 3 based on a motor rotation angle signal received from the resolver 6 which detects the rotation angle of the motor as mentioned before. In response to a signal output from the FET driver 103, the PWM inverter 104 feeds currents to the brushless motor 5 so as to generate the assist torque. The calculation means 100 provides the control by transmitting the signal to the FET driver 103 so that the current values fed to the brushless motor 5 becomes a desired value for generating the assist torque.

Moreover, in the first operation state, the motor rotation angle signal is acquired by the normal excitation by the resolver I/F first circuit 105, in the same manner as that in the first operation state of the first embodiment.

A description is now given of a second operation state in which the IG switch 10 is turned off, and the motor control by the calculation means 100 is stopped.

Though the calculation means 100 stops the motor control which imposes a high calculation load, the calculation means 100 continues the calculation of the motor rotation angle which has a low calculation load in the second operation state. Only the processing having the low calculation load continues in this way, and the motor rotation angle can thus be calculated in a mode in which the current consumption is small.

Moreover, in the second operation state, the motor rotation angle signal is acquired by carrying out the intermittent excitation by using a resolver I/F second circuit 202, in the same manner as that in the second operation state of the first embodiment.

Moreover, with respect to the calculation means 100, an increase in reliability of the calculation of the rotation angle is provided by monitoring for an abnormality in the calculation means 100 using the second monitoring means 201 in the first operation state and the second operation state. The monitoring by the second monitoring means 201 includes a window watch dog timer, a power-on reset, a low voltage detection, and checks of various calculation results. If an abnormality is detected, the calculation means 100 is reset.

The calculation means 100 is monitored by the second monitoring means 201 in the first operation state and the second operation state, and the reliability for the motor rotation angle can thus be increased.

A description is now given of a method of reducing the current consumption.

A description is first given of a method of changing the power supply for the calculation means 100.

The calculation means 100 continues the calculation using the second power supply 302 in order to reduce the current consumption in the second operation state in which the calculation means 100 stops the motor control according to the IG switch 10.

A description is now given of a method of changing a calculation cycle of the calculation means 100 in order to reduce the current consumption.

Also in this embodiment, similarly to the first embodiment, a calculation cycle of the calculation means 100 in the second operation state is changed to a second calculation cycle, which is longer than the first calculation cycle of the calculation means 100 in the first operation state as illustrated in FIG. 3, to thereby realize a reduction in current consumption. The first calculation cycle and the second calculation cycle are the same as those described in the first embodiment.

The intermittent excitation operation using the resolver 6 serving as the motor rotation angle detection means is the same as that in the first embodiment.

Though the current consumption can be reduced as the second calculation cycle is extended, if the motor exceeds the limit of the motor rotation angular velocity which can be measured in the second calculation cycle, the reading of the motor rotation angle may be missed, similarly to the first embodiment. To address this problem, if the calculation cycle of the calculation means 100 is extended, the second calculation cycle is switched to a short cycle as illustrated in FIG. 4 before the brushless motor 5 exceeds the limit of the motor rotation angular velocity which can be measured in the second calculation cycle according to this embodiment as in the first embodiment. The motor rotation state detection means 203 is used for determining the rotation angular velocity of the motor.

The operation of the motor rotation state detection means 203 is the same as that in the first embodiment.

Moreover, the area required for mounting can be reduced by forming the second monitoring means 201, the resolver I/F second circuit 202, and the motor rotation state detection means 203 into the single monolithic IC 200 as illustrated in FIG. 9 as in the first embodiment according to this embodiment. The resolver I/F second circuit 202 is constructed by the excitation circuit, the receiver circuit, and the sample-and-hold means as in the first embodiment. Moreover, the motor rotation state detection means 203 is constructed by the amplifier circuit for amplifying the induced voltage after the rectification and the comparator circuit having the hysteresis.

As described above, the second embodiment also provides the same effects as those provided by the above-mentioned first embodiment. Specifically, the calculation of the motor rotation angle can be continued consuming a small current while reliability is secured even in the period in which the motor control is stopped. Moreover, the number of microcomputers used as the calculation means is one according to the second embodiment, and the cost and the area for mounting can thus be reduced.

What is claimed is:

1. A motor control device, comprising:
   a motor rotation angle detector for outputting a motor rotation angle signal for detecting a rotation angle of a motor;
   a calculator for carrying out control for the motor; and
   a monitoring device for detecting a presence and absence of an abnormality of the calculator, wherein:
   the calculator has two operation states;
   one of the two operation states is a first operation state in which the calculator uses a first amount of current to calculate the rotation angle of the motor based on the motor rotation angle signal output from the motor rotation angle detector to control the motor based on the calculated rotation angle of the motor; and
   another one of the two operation states is a second operation state in which the control for the motor is stopped, and the calculator uses a second amount of current less than the first amount of current to calculate the rotation angle of the motor based on the motor rotation angle signal output from the motor rotation angle detector.

2. A motor control device according to claim 1, wherein:
   the calculator comprises a main calculator and a sub calculator;
   in the first operation state, the calculator calculates the rotation angle of the motor based on the motor rotation angle signal output from the motor rotation angle detector using the main calculator, and controls the motor based on the calculated rotation angle of the motor; and
   in the second operation state, the calculator stops the operation of the main calculator, and calculates the rotation angle of the motor based on the motor rotation angle signal output from the motor rotation angle detector using the sub calculator;
   the monitoring device is provided in the sub calculator; and
   the sub calculator monitors a presence and absence of an abnormality of the main calculator using the monitoring device in the first operation state.

3. A motor control device according to claim 2, wherein:
the monitoring device comprises a first monitoring device and a second monitoring device;
the first monitoring device is provided in the sub calculator;
the sub calculator monitors a presence and absence of an abnormality of the main calculator using the first monitoring device in the first operation state; and
the second monitoring device is provided outside the sub calculator, and monitors a presence and absence of an abnormality of the sub calculation device in the first operation state and the second operation state.

4. A motor control device according to claim 2, further comprising:
a first power supply for supplying the main calculator and the sub calculator with electric power; and
a second power supply having current consumption smaller than that of the first power supply,
wherein the sub calculator is provided with electric power by the second power supply in the second operation state.

5. A motor control device according to claim 4, wherein the first power supply supplies the main calculator and the sub calculator with electric power in the first operation state, and supplies the main calculator and the sub calculator with no electric power in the second operation state.

6. A motor control device according to claim 1, further comprising:
a first power supply for supplying the calculator with electric power; and
a second power supply having current consumption smaller than that of the first power supply,
wherein the calculator is provided with electric power by the first power supply in the first operation state, and is provided with electric power by the second power supply in the second operation state.

7. A motor control device according to claim 1, wherein:
the calculator calculates the rotation angle of the motor in a predetermined first calculation cycle in the first operation state, and calculates the rotation angle of the motor in a predetermined second calculation cycle in the second operation state; and
the predetermined second calculation cycle is longer than the predetermined first calculation cycle.

8. A motor control device according to claim 7, wherein the predetermined second calculation cycle is shortened as a rotation speed of the motor increases.

9. A motor control device according to claim 7, wherein the predetermined second calculation cycle is shortened as an induced voltage of the motor increases.

10. A motor control device according to claim 1, wherein the motor rotation angle detector comprises a resolver, and an excitation signal applied to the resolver is a pulse signal.

11. A motor control device according to claim 10, further comprising a sample-and-hold device for sampling and holding the motor rotation angle signal output from the resolver,
wherein the sample-and-hold device samples the motor rotation angle signal immediately after the pulse signal turns on, and holds the motor rotation angle signal immediately before the pulse signal turns off.

12. A motor control device according to claim 10, wherein at least a part of the monitoring device, an excitation circuit for applying the excitation signal to the resolver, a receiver circuit for receiving the motor rotation angle signal from the resolver, the sample-and-hold device, and a motor rotation state detector for determining a rotation state of the motor based on an induced voltage of the motor constitute a single monolithic IC.

13. A motor control device according to claim 12, wherein the motor rotation state detection detector includes an amplifier circuit for amplifying the induced voltage of the motor, sets a gain of the amplifier circuit by a resistance of a resistor connected to the single monolithic IC, and determines the rotation state of the motor by comparing an output voltage of the amplifier circuit and a predetermined threshold set in advance with each other.

14. A motor control device according to claim 1, wherein:
the motor control device is installed on an electric power steering device; and
the electric power steering device calculates a steering angle from the rotation angle of the motor calculated by the motor control device.

* * * * *